April 20, 1937.     H. J. HORN     2,077,695
BRAKE DRUM
Filed Aug. 5, 1935
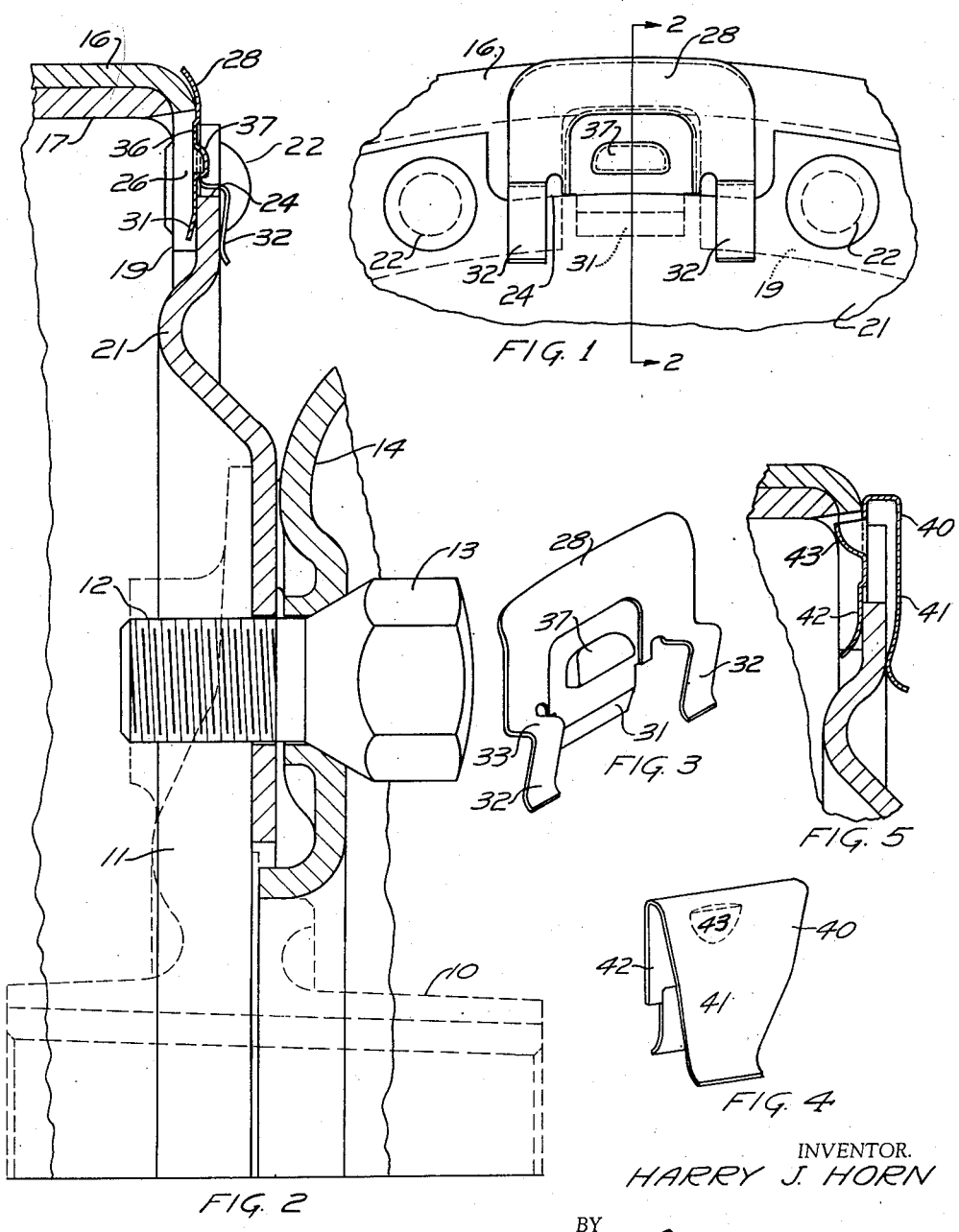
INVENTOR.
HARRY J. HORN
BY
Carroll R. Taber
ATTORNEY.

Patented Apr. 20, 1937

2,077,695

UNITED STATES PATENT OFFICE 2,077,695

BRAKE DRUM

Harry J. Horn, Lansing, Mich., assignor to Motor Wheel Corporation, Lansing, Mich., a corporation of Michigan Application August 5, 1935, Serial No. 34,744

10 Claims. (Cl. 188—218)

This invention relates to wheel constructions and particularly to metallic wheel structures for use on automotive vehicles.

In the manufacture of vehicle wheels it has been the general practice to provide an opening in the brake drum adjacent the braking surface to permit the insertion of a measuring instrument in adjusting the brake shoes, to insure the proper clearance between the brake lining and the braking surface. This opening is known generally as a peek-hole.

It has also been common practice to provide a cover for the peek-hole opening to prevent water, dirt and other injurious matter from coming in contact with the brake lining. This cover usually has been secured to the brake drum by screws or bolts necessitating their removal when it is desired to gain access to the interior of the brake drum through the peek-hole.

With one piece brake drums, it has been a comparatively simple matter to fit a cover over the peek-hole because the surface contour of the drum adjacent the opening is smooth and unbroken; however, with the advent of composite brake drums comprising a brake ring having a radial flange secured in overlapping relation to a separate brake drum web, a more difficult problem has been presented in fitting a cover over the peek-hole due to the uneven contour of the surface adjacent this opening.

It is therefore a general object of this invention to provide a brake drum peek-hole cover, and it is a particular object to provide such a cover adapted to engage the uneven surfaces of the brake drum where a composite drum is employed. A further object resides in the provision of a peek-hole cover which may be quickly and easily removed from the brake drum.

In the drawing:

Figure 1 is a fragmentary elevational view of a brake drum having the peek-hole cover of the present invention secured thereto;

Figure 2 is a fragmentary vertical sectional view taken substantially on the line 2—2 of Figure 1;

Figure 3 is a perspective view of the peek-hole cover.

Figure 4 is a perspective view of a modified form of cover; and

Figure 5 is a fragmentary vertical sectional view of a drum showing the cover of Fig. 4 installed thereon.

Reference numeral 10 indicates a wheel hub having a radially extending flange 11 provided with suitably spaced threaded openings 12 therein to receive stud bolts 13 which are employed to secure the bolting on flange 14 of a wheel body (not shown) to the hub flange 11.

A circular brake ring 16 having a braking surface 17 positioned on the inner periphery thereof and a radial flange 19 at one edge thereof is secured to a radial brake drum web 21. The attachment being preferably effected by means of rivets 22 connecting the flange 19 to the web 21 in overlapping relation. The web 21 is attached to the hub flange 11 in a conventional manner by rivets, not shown.

It will be noted that the outer periphery 24 of the brake drum web 21 is positioned radially inwardly of the braking surface 17 of ring 16. A peek-hole 26 of suitable size and shape is formed in the flange 19 of the brake ring and positioned so that a substantial portion thereof extends between the outer peripheral limits of the brake drum web 21 which is notched at that point and the brake ring 16.

In accordance with the present invention, a cover 28 is positioned over the peek-hole 26 between the outer periphery of the brake drum web 21 and the outer peripheral limits of the brake ring 16. The cover comprises a bent plate or stamping having spaced cooperating resilient fingers formed thereon to engage the opposite sides of the brake drum web at its periphery.

As shown, the cover plate 28 is positioned exteriorly of the brake drum web and extends around three sides of the peek-hole. It is provided with a resilient finger portion 31 in substantially the same plane therewith and a pair of spaced resilient fingers 32 spaced from finger 31 are bent transversely out of the plane of the cover plate to form shoulder portions 33 and then bent downwardly and slightly curved adjacent the free ends thereof to form engaging surfaces. Fingers 32 are longer than fingers 31 and engage the brake drum at a point radially inwardly of the point at which finger 31 engages the drum. This arrangement of the fingers holds the cover in position over the peek-hole.

The cover plate 28 is also provided with an inwardly extending embossed portion 36 substantially conforming in shape to the shape of the peek-hole 26 and adapted to engage the walls thereof. An outwardly extending boss 37 is formed on the exterior side of the cover so that a screw driver or other tool may be engaged therewith to remove the cover plate from the brake drum.

As shown, the cover is positioned over the peek-hole 26 with the resilient fingers 32 thereof in engagement with the outer wall of the brake drum web 21 and the finger 31 in engagement with the inner wall thereof, the embossed portion 36 engaging the walls around the opening. The entire cover may be formed of spring metal and the fingers 31 and 32 suitably bent so that when positioned upon the brake drum web they will tightly and resiliently form an engagement therewith.

The cover construction shown in Figures 4 and 5 comprises a plate 40 bent to form a pair of spaced apart resilient finger portions 41 and 42, in such manner that the two finger portions constitute the entire plate. Finger 41 is longer than finger 42 and is deformed near its free extremity to contact the brake drum web as shown in Figure 5. Finger 42 is also deformed at its free extremity to contact the inner surface of the web radially outwardly of the point of contact between finger 41 and the web.

Cover 40 is installed by inserting finger 42 in the peek-hole and over the periphery of the web. It is locked in this position by means of an integral projection 43 punched out of portion 42 remote from its free extremity. Projection 43 is adapted to be sprung past the radially outer edge of the peek-hole after finger 42 has been inserted into the hole as previously described. When thus sprung into position the cover is firmly fastened to the drum but may be removed by distorting the resilient cover sufficiently to permit the projection to pass the upper limit of the peek-hole.

It will thus be seen that the uneven contour resulting from a composite brake drum construction has been taken advantage of in providing a simple peek-hole cover which is resiliently attached to the periphery of the brake drum web and therefore quickly and easily removable to provide access to the interior of the brake drum.

Various modifications in construction and design will suggest themselves to those skilled in the art but it is to be understood that the invention is to be limited only by the scope of the appended claims.

I claim:

1. In a vehicle wheel having a brake drum provided with a peek-hole, a cover for said peek-hole comprising a plate having cooperating spaced fingers engaging opposite sides of a wall of said brake drum.

2. In a vehicle wheel having a brake drum provided with a peek-hole, a cover for said peek-hole comprising a plate having cooperating spaced resilient fingers engaging opposite sides of a wall of said brake drum.

3. In a vehicle wheel having a brake drum provided with a peek-hole, a cover for said peek-hole comprising a plate having spaced oppositely disposed cooperating fingers, one of said fingers engaging an interior wall surface of said brake drum and one engaging an exterior wall surface thereof.

4. In a vehicle wheel having a brake drum provided with a peek-hole, a cover for said peek-hole comprising a plate engaging the exterior wall of said brake drum around said opening and having an embossed portion positioned within said opening and engaging the walls thereof, and oppositely disposed cooperating resilient securing fingers also engaging a wall of said brake drum.

5. In a vehicle wheel having a composite brake drum comprising a brake ring and a brake drum web secured together in overlapping relation, a portion of said brake ring being provided with a peek-hole, a cover positioned over said peek-hole comprising oppositely disposed fingers engaging opposite sides of said brake drum web adjacent the periphery thereof.

6. In a vehicle wheel having a composite brake drum comprising a brake ring provided with a radial flange having a peek-hole therein and a brake drum web secured to said flange in overlapping relation thereto, said web terminating in a radial direction short of the outer peripheral limits of said brake ring and said peek-hole having a substantial portion thereof extending between the outer peripheral limits of said web and the outer periphery of said brake ring, a cover positioned over said peek-hole comprising a plate, and a resilient finger substantially in the plane of said plate and engaging the outer wall of said web.

7. In a vehicle wheel having a brake drum provided with a peek-hole, a cover for the peek-hole comprising a plate having spaced portions adapted to engage the opposite wall of the drum adjacent one edge of the hole and a projection adapted to engage another edge of the hole to prevent the inadvertent removal of the cover.

8. In a wheel having a brake drum provided with a peek-hole, a cover for the peek-hole comprising a resilient plate having spaced cooperating fingers adapted to engage the opposite sides of a wall of the drum adjacent said hole at radially spaced points.

9. In a brake drum provided with a peek-hole, a cover for the peek-hole comprising a resilient plate bent to form a pair of spaced engaging portions adapted to engage the opposite surfaces of a wall of the drum adjacent one edge of the hole, one of said engaging portions being provided with integral projections adapted to be sprung into the hole for locking the cover in position.

10. In a vehicle wheel, a brake ring having a peek-hole formed therein, a separate brake drum web secured to said brake ring in overlapping relation thereto, and a cover positioned over said peek-hole and resiliently engaging the opposite sides of the edge portion of said web.

HARRY J. HORN.